(12) United States Patent
Salciarini et al.

(10) Patent No.: US 11,945,165 B2
(45) Date of Patent: Apr. 2, 2024

(54) METHOD INCLUDING ADDITIVE MANUFACTURING A PART AND POST-PROCESSING WITH TWO IONIZING BARS AND A ROTARY BARREL

(71) Applicant: CHANEL PARFUMS BEAUTE, Neuilly-sur-Seine (FR)

(72) Inventors: Christian Salciarini, Hyeres (FR); Quentin Bertucchi, Asnieres sur Seine (FR)

(73) Assignee: CHANEL PARFUMS BEAUTE, Neuilly-sur-Seine (FR)

( * ) Notice: Subject to any disclaimer, the term of this patent is extended or adjusted under 35 U.S.C. 154(b) by 162 days.

(21) Appl. No.: 16/962,140

(22) PCT Filed: Jan. 9, 2019

(86) PCT No.: PCT/FR2019/050037
§ 371 (c)(1),
(2) Date: Jul. 14, 2020

(87) PCT Pub. No.: WO2019/138183
PCT Pub. Date: Jul. 18, 2019

(65) Prior Publication Data
US 2020/0406549 A1    Dec. 31, 2020

(30) Foreign Application Priority Data

Jan. 15, 2018 (FR) ...................................... 1850297

(51) Int. Cl.
*B29C 64/35* (2017.01)
*B29C 64/153* (2017.01)
(Continued)

(52) U.S. Cl.
CPC ............. *B29C 64/35* (2017.08); *B29C 64/153* (2017.08); *B33Y 10/00* (2014.12); *B33Y 40/10* (2020.01);
(Continued)

(58) Field of Classification Search
CPC ..... B29C 64/35; B29C 64/153; B29C 64/357; B29C 64/364; B29C 64/165;
(Continued)

(56) References Cited

U.S. PATENT DOCUMENTS 4,861,663 A    8/1989  Sirinyan
6,245,281 B1 *  6/2001  Scholten ................ B33Y 70/00
264/460

(Continued)

FOREIGN PATENT DOCUMENTS

CN    203650266 U    6/2014
CN    104404440 A  *  3/2015
(Continued)

OTHER PUBLICATIONS

Extreme Mechanics Letters NPL (EML 9 422-429-2016). (Year: 2016).*
(Continued)

Primary Examiner — Jeffrey M Wollschlager
Assistant Examiner — Guy F Mongelli
(74) Attorney, Agent, or Firm — GREENBLUM & BERNSTEIN, P.L.C.

(57) ABSTRACT

A method for post-processing part obtained by additive manufacturing through sintering of a plastic powder, in order to remove particles detached from the part or partially sintered, the method including, consecutively, stripping (S1) and ionizing blowing (S2). Such a method makes it possible to remove particles having a largest dimension greater than a given dimension. The invention also relates to a corre-
(Continued)

sponding manufacturing method of a plastic material part, and to a corresponding production method.

14 Claims, 2 Drawing Sheets

(51) Int. Cl.
| | |
|---|---|
| *B29C 64/357* | (2017.01) |
| *B29K 77/00* | (2006.01) |
| *B33Y 10/00* | (2015.01) |
| *B33Y 40/10* | (2020.01) |
| *B33Y 40/20* | (2020.01) |
| *B33Y 70/00* | (2020.01) |

(52) U.S. Cl.
CPC .............. *B33Y 40/20* (2020.01); *B33Y 70/00* (2014.12); *B29C 64/357* (2017.08); *B29K 2077/00* (2013.01)

(58) Field of Classification Search
CPC .............. B29C 71/0081; B29C 64/188; B29C 2059/027; B33Y 10/00; B33Y 40/20; B33Y 70/00; B33Y 40/00; B29K 2077/00; B22F 2003/247
See application file for complete search history.

(56) References Cited

U.S. PATENT DOCUMENTS

| | | | | |
|---|---|---|---|---|
| 7,285,234 | B2* | 10/2007 | Pfeifer | B22F 12/67 |
| | | | | 264/483 |
| 8,991,211 | B1* | 3/2015 | Arlotti | C03B 19/06 |
| | | | | 65/17.3 |
| 11,267,198 | B2* | 3/2022 | Salciarini | B24C 1/08 |
| 2002/0079601 | A1* | 6/2002 | Russell | B33Y 40/00 |
| | | | | 425/375 |
| 2004/0180980 | A1* | 9/2004 | Petter | C08L 33/12 |
| | | | | 522/2 |
| 2004/0182510 | A1* | 9/2004 | Pfeifer | B22F 3/004 |
| | | | | 156/272.8 |
| 2005/0186872 | A1* | 8/2005 | Wang | D06M 15/564 |
| | | | | 442/88 |
| 2005/0242472 | A1* | 11/2005 | Goldbach | B29C 51/424 |
| | | | | 264/492 |
| 2006/0249485 | A1* | 11/2006 | Partanen | B29C 64/153 |
| | | | | 219/121.6 |
| 2006/0251826 | A1* | 11/2006 | Pfeifer | B22F 1/10 |
| | | | | 427/212 |
| 2007/0134496 | A1* | 6/2007 | Katagiri | H01L 23/3733 |
| | | | | 257/E23.03 |
| 2008/0153947 | A1* | 6/2008 | Booth | C08L 77/02 |
| | | | | 524/81 |
| 2012/0211029 | A1 | 8/2012 | Pandit et al. | |
| 2013/0217838 | A1* | 8/2013 | DeFelice | B29C 64/357 |
| | | | | 528/125 |
| 2016/0236414 | A1* | 8/2016 | Reese | B33Y 50/02 |
| 2016/0244628 | A1* | 8/2016 | Breton | C09D 11/12 |
| 2016/0368077 | A1* | 12/2016 | Swaminathan | B23K 10/003 |
| 2017/0363377 | A1 | 12/2017 | Phillips | |
| 2018/0065310 | A1* | 3/2018 | Hodgdon | C08K 3/36 |
| 2019/0126539 | A1* | 5/2019 | Mata | D01D 5/0023 |

FOREIGN PATENT DOCUMENTS

| | | | | |
|---|---|---|---|---|
| CN | 104440585 A * | 3/2015 | | B24C 3/02 |
| CN | 104479440 A * | 4/2015 | | |
| CN | 104818482 A * | 8/2015 | | B24C 3/02 |
| CN | 105728723 A | 7/2016 | | |
| CN | 105907172 A * | 8/2016 | | B29C 64/112 |
| CN | 106917083 A * | 7/2017 | | B22F 10/20 |
| CN | 106984811 A * | 7/2017 | | B29C 64/141 |
| DE | 3636606 A * | 5/1988 | | C08J 7/02 |
| DE | 10 2013 207 354 | 10/2014 | | |
| DE | 102013207354 A1 | 10/2014 | | |
| DE | 11 2012 005 401 | 12/2014 | | |
| DE | 102014102137 A1 * | 8/2015 | | B29C 64/141 |
| EP | 589660 A1 * | 3/1994 | | B29C 59/16 |
| WO | 2011/145960 A1 | 11/2011 | | |
| WO | WO-2011145960 A1 * | 11/2011 | | B29C 67/0096 |
| WO | WO-2017131758 A1 * | 8/2017 | | B29C 64/165 |
| WO | WO-2018190829 A1 * | 10/2018 | | B29C 64/165 |

OTHER PUBLICATIONS

CN 105907172 translation (Year: 2022).*
DE 3636606 translation (Year: 2022).*
KR 2004/0012862 translation (Year: 2022).*
CN-104404440-A translation (Year: 2023).*
CN-104479440-A translation (Year: 2023).*
CN-104818482-A translation (Year: 2023).*
CN 104440585 translation (Year: 2023).*
Dyemansion Powershot S NPL (https://web.archive.org/web/20170904005456/http://dyemansion.de:80/en/powershot-s/) (Year: 2023).*
International Search Report issued in International Patent Application No. PCT/FR2019/050037, dated Apr. 26, 2019, along with an English translation thereof.
Third Party Observations issued in EP Patent App. 19704657.6 dated Apr. 23, 2021 with machine English translation.
Office action from the corresponding Chinese patent application No. 20198008430.9, office action dated Dec. 3, 2021, along with an English language translation thereof.
Opposition to European Patent No. 3 740 375, Notice dated Jul. 27, 2022, with English language translation.
M. Schmid, Additive Manufacturing with Selective Laser Sintering (SLS), ETH, Zurich, 2015; relevance of "Schmid", if any, appears in the above-mentioned Opposition.
J. Breuninger et al., Additive manufacturing with plastics, Springer Vieweg, 2013; relevance of "Breuninger", if any, appears in the above-mentioned Opposition.
https://www.youtube.com/watch?v=xUeleGg42ao and 8 screenshots of the video, entitled Introducing DyeMansion Powershot C I Additive Manufacturing Finishing Systems, 8.811 Aufrufe, Feb. 22, 2017.

* cited by examiner

METHOD INCLUDING ADDITIVE MANUFACTURING A PART AND POST-PROCESSING WITH TWO IONIZING BARS AND A ROTARY BARREL

BACKGROUND

1. Field of the Invention

The present invention concerns the field of the industrial methods for obtaining small size parts of plastic material, such as cosmetic product applicators, by additive manufacturing.

The application of a cosmetic product in liquid, fluid or powder form is generally carried out using an applicator comprising bristles or teeth making it possible to retain the cosmetic product like the bristles of a paintbrush. In the present document, cosmetic products encompass particularly for example all make-up products for the skin, the lips or the superficial appendages. cosmetic products also encompass care products, in particular liquid care formulas, provided for application to the skin, the lips and the superficial appendages.

Although the invention potentially concerns any plastic part obtained by additive manufacture for which it is advantageous to guarantee the absence of detached particles further to the additive manufacturing or that are liable to detach on use of the part, the invention has a particular interest in the context of an applicator for a cosmetic product provided for application near the eyes, in particular on the eyelashes or the eyelids. For example, the cosmetic product may be mascara, eye shadow, or eye contour makeup commonly referred to as "eyeliner".

2. Description of the Background

An item of mascara, or "mascara", conventionally comprises a case, a mascara reservoir and an applicator. Several types of applicator exist, those of "bottle brush" type, those that are injection molded and those produced by additive manufacturing (sometimes called "additive manufacture"). Additive manufacturing designates the methods of manufacturing by addition or aggregation of matter, also commonly designated by the expression "three-dimensional printing" or "3D printing".

An applicator of bottle brush type comprises a brush which has bristles formed by fibers trapped in a twisted metal wire forming the core of the applicator.

An injection-molded applicator is generally formed of one piece and comprises bristles or teeth of plastic material for example.

An applicator manufactured by additive manufacturing is also generally of one piece and can be formed for example from a powder of thermoplastic polymers.

The conventional methods of obtaining a part by additive manufacturing enable parts to be obtained having very precise dimensional features. Nevertheless, these applicators may have particles that are detached or liable to detach when application is carried out. This alters the quality of the application and may prove problematic in particular on application of a cosmetic product near the eyes, for example on the eyelids. In particular, particles having a certain size may be an irritant for the cornea.

In addition to the cosmetic field, the production by additive manufacturing of parts of plastic material is being developed in numerous technical fields, in particular the medical field or that of precision mechanics, in which it is advantageous or important to guarantee the absence of particles that are residual or liable to detach from a part obtained by additive manufacturing.

SUMMARY

The invention seeks to provide a method of post-treatment of plastic parts obtained by additive manufacturing solving at least one of the aforementioned problems. The post-treatment according to the invention lies within the context of a manufacturing method by additive manufacturing to which the invention also relates.

The invention thus relates to a method of post-treatment of a part obtained by additive manufacturing by sintering of a powder of a plastic material, for the elimination of the particles detached from said part or that are partially sintered, the method comprising successively:
  stripping; and
  ionizing blowing.

The succession of the parts of the method of the invention enables elimination of the particles in the product obtained by additive manufacturing. In particular, stripping, that is to say unsticking or eliminating the residues, dirt and undesired matter from the part produced, followed by ionizing blowing, making it possible to guarantee the absence of particles that are detached or liable to detach on use of the part.

The particles may in particular comprise:
  grains of powder of the material employed for the manufacture which remain jammed in the interstices of the part or in the bristles that it comprises (for example in the case of a brush obtained by additive manufacturing);
  grains of powder incompletely sintered during the additive manufacturing;
  residues from sand-blasting, when the method comprises sand-blasting.

The elimination of the particles is an important issue in numerous technical fields, in particular the medical, food, or cosmetic field. In particular, the applicant has noted in the field of cosmetic products that it is important for the applicators used near the eyes (for example mascara brushes) to be free of particles, and in particular totally free of particles of larger size greater than 500 microns which can irritate the cornea.

The method makes it possible, according to the parameters employed for each part thereof, to eliminate particles of undesired sizes from the final product.

The stripping may comprise (or be constituted by) a sand-blasting of said part. The sand-blasting may for example employ glass microspheres of a diameter comprised between 45 and 90 microns.

The method of post-treatment may comprise pre-blowing prior to the sand-blasting.

The method of post-treatment may furthermore comprise washing as a final part of the method. The washing (S3) may comprise the washing of the part in a non-aqueous solvent.

For example, the sand-blasting and the ionizing blowing may be carried out in batches of 300 to 10 000 parts.

The invention also relates to a method of manufacturing a part of plastic material, comprising additive manufacturing by sintering a powder of the plastic material, followed by depowdering and a method of post-treatment as defined earlier.

The plastic material employed may be a polyamide, preferably an aliphatic polyamide, for example polyamide 11.

The manufacturing method may comprise, prior to the additive manufacturing, a processing of the polyamide powder comprising:

- providing new powder having only grains of which the greatest dimension is less than or equal to 150 microns;
- providing so-called used powder, having already served for an additive manufacturing, and the calibration of said used powder in order for it to have only grains of which the greatest dimension is less than or equal to 150 microns;
- mixing the new powder and the calibrated used powder in a new powder/used powder ratio comprised between 70/30 and 50/50, preferably of the order of 60/40.

Lastly the invention relates to a method of producing a part comprising a manufacturing method as defined earlier, and further comprising a qualifying comprising determining, in a batch of a predetermined number of parts, the number of residual particles that are detached or partially sintered of largest dimension greater than a predefined dimension, and, if said number particles is not zero, modifying at least one parameter of a post-treatment step, then the succession of such manufacturing methods and qualifying steps until said number of particles of largest dimension greater than a predefined dimension is zero.

Still other particularities and advantages of the invention will appear in the following description.

BRIEF DESCRIPTION OF THE DRAWINGS

In the accompanying drawings, given by way of non-limiting examples.

DETAILED DESCRIPTION

Figure 1:
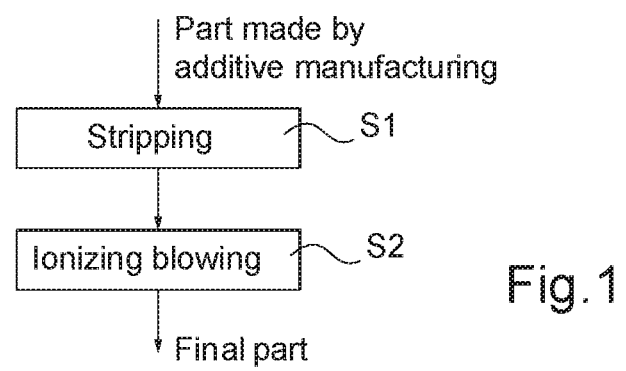
FIG. 1 is a block diagram representing a method of post-treatment of a part obtained by additive manufacturing in accordance with a first aspect of the invention.

FIG. 1 illustrates parts of a method, in accordance with an embodiment, of post-treatment of a part obtained by additive manufacturing, namely by sintering a powder of a plastic material.

The method comprises stripping (S1), and ionizing blowing (S2). The method is applicable to a part or to a set (batch) of parts. Being particularly advantageous in an industrial context, it is described below for the treatment of several parts.

Stripping (S1)

The method of post-treatment of parts obtained by additive manufacturing commences by stripping S1. The parts come from additive manufacturing by sintering a powder of a plastic material, for example polyamide of the PA11 type, as is detailed with reference to FIG. 4. After manufacturing, the parts were taken out of the powder and may have been subjected to a depowdering operation, also detailed with reference to FIG. 4 below, but they may have particles that are detached or liable to detach on use. The method is directed to ensuring the absence of particles, within certain ranges of dimensions, in the final product, that is to say on the final part.

The stripping consists of applying a mechanical action to the surface of the parts so as to eliminate the undesired matter located there, such as the detached or partially sintered grains of powder or any impurity.

The stripping may be achieved by projecting a fluid or particulate substance onto the surface of the parts. This projecting may be carried out in a rotary barrel or drum. For example, the stripping may correspond to sand-blasting (as in the method of FIG. 2).

In the case of stripping of parts of small size, such as mascara applicators, the stripping may be carried out by batches of 300 to 10 000 parts for example, in particular from 3000 to 4000 parts.

Ionizing Blowing (S2)

The method comprises, after the stripping S1, an ionizing blowing S2. As a matter of fact, the stripping may leave particles lodged in the interstices or bristles of the part obtained by additive manufacturing. The particles are primarily particles of the material constituting said part, for example grains of PAH, but may also be particles of an abrasive employed at the stripping S1, as the case may be (typically when the stripping comprises sand-blasting).

Ionizing in general terms consists of removing or adding charges to an atom or molecule. Thus, the ionizing systems commonly called ionizers, produce ions which are charged atoms. The ionizers take different forms. The most frequent form is that of a bar. The ionizing bar must be located near the medium to ionize, typically less than 50 mm. The applicant has identified that the implementation of an ionizing blowing is particularly relevant in a method of post-treatment of parts obtained by additive manufacturing, in particular the post-treatment of cosmetic product applicators. As a matter of fact, in cleaning by ionizing blowing, the ionizing makes it possible to eliminate the effects of static electricity carried by the part. The stream of air from the blowing makes it possible to separate the residual particles from the parts, at the surface of which they are no longer retained by static electricity. The particles so separated from the parts are sucked out of the ionizing blowing chamber.

The ionizing blowing may be carried out in a barrel or drum identical to that used for the stripping S1, or possibly in the same drum as that used for the stripping S1.

For the ionizing blowing S2, the device advantageously comprises two ionizing systems, for example two ionizing bars. One bar is positioned inside the barrel (or other chamber) and one bar is disposed outside.

The following parameters for blowing may be employed with success, in particular for the post-treatment of cosmetic product applicators of mascara brush type, or of parts of similar dimensions. The ionizing blowing may be carried out under a pressure of 4 bars. The ionizing blowing S5 may last 30 to 40 minutes.

The ionizing blowing S5 may be carried out by batches of 300 to 10 000 parts for example, in particular from 3000 to 4000 parts such as cosmetic product applicators.

Naturally, parameters that are close may be employed with success. For example and in non-limiting manner, the blowing pressure may be from 3 to 5 bars, the duration of blowing may be significantly reduced, and for example be of the order of 15 minutes or less.

Further to the succession of the steps of stripping and of ionizing blowing, the parts, for example the cosmetic product applicators, it is certain that the parts are rid of the particles of undesired dimensions. The parameters enable in particular the elimination of practically all the particles greater than 150 microns on a cosmetic product applicator, and the elimination of the entirety of the particles of more than 500 microns.

Figure 2:
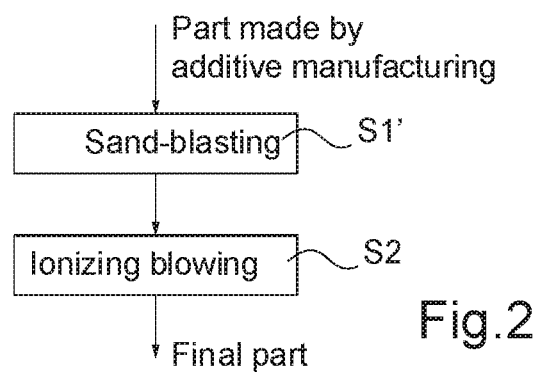
FIG. 2 is a block diagram representing a first variant of the method of FIG. 1.

FIG. 2 represents a method identical to that of FIG. 1, in which the stripping S1 is a sand-blasting S1'.

Sand-Blasting (S1')

Sand-blasting is a known technique for cleaning a surface, which uses an abrasive projected at high speed using a compressed gas (generally air) by a nozzle onto the surface to clean.

Nevertheless, sand-blasting of parts made using additive manufacturing by sintering a powder of a plastic material requires the implementation of optimized parameters. For example, for cosmetic product applicators the parameters are configured on account of the small size of the applicators, of the requirement to sand-blast extremely fine members (namely the bristles of the applicators) without destroying them, of the advantage of sand-blasting a large quantity of parts at the same time (for example from 300 to 10 000 parts), and of the importance of detaching from the parts by sand-blasting all the particles liable to detach on use of the applicator.

The sand-blasting S1' makes it possible to eliminate the partially sintered grains of powder in particular. The sand-blasting is carried out in a sand-blaster comprising at least one nozzle projecting glass spheres having a diameter from 45 to 90 microns. The sand-blasting also makes it possible to obtain the desired surface state on the parts. Other abrasive media may be envisioned for example bicarbonate, or compressed fruit pits.

In addition to the nature and the size of abrasive particles, the type of sand-blasting machine, the injection pressure, the distance of the nozzle in relation to the surface of the barrel, are important parameters to obtain the desired results.

For the treatment of a large batch of parts (for example of the order of 3000 to 4000 parts) the following parameters have been determined with success. The sand-blasting is carried out in a sand-blaster with a rotary barrel. The barrel chosen has a diameter of 500 mm. The barrel turns at 3 revolutions per minute to ensure the stirring of the parts. The sand-blasting may last from 35 to 45 minutes, for example 40 minutes. The spheres are injected under an air pressure of 2.5 bars.

The person skilled in the art will of course understand that the invention is not limited to these aforementioned parameters, given by way of example.

The stirring may be improved by the use of a second nozzle, blowing laterally into the barrel and/or raising the parts relative to the surface of the barrel.

Figure 3:
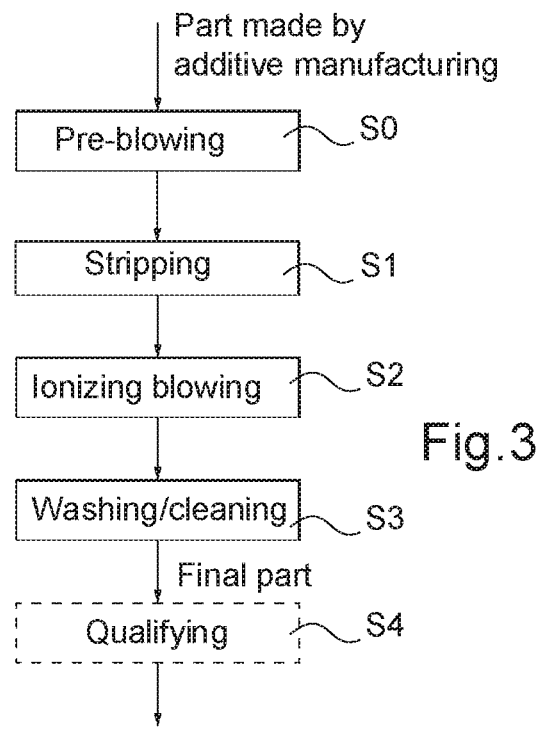
FIG. 3 is a block diagram representing a post-treatment method in accordance with an embodiment of the invention, comprising the method of FIG. 1 and optional method parts.

FIG. 3 represents a method of post-treatment in accordance with an embodiment of the invention and comprising optional method parts. In particular, the method comprises a pre-blowing (S0) prior to the stripping. The method comprises washing/cleaning (S3) successive to the ionizing blowing (S2).

Furthermore, the method of FIG. 3 has a qualifying final part (S4), outside the post-treatment method.

Pre-Blowing (S0)

The pre-blowing S0 is carried out on the parts before their stripping. This method part makes it possible to ensure that the particles easily detachable from the parts are eliminated before tackling the stripping of the parts. The pre-blowing is thus directed to removing a maximum of particles by subjecting the parts obtained by additive manufacturing to a stream of air under pressure.

The pre-blowing may advantageously be carried out in the barrel of the machine which will be used for the stripping S1. The pre-blowing may be carried out for 5 to 10 minutes, for example 7 minutes, with two nozzles blowing air at 2.5 bars.

Washing/Cleaning (S3)

Complementary cleaning may be carried out in a method part referred to as washing/cleaning S3.

By cleaning is meant any type of action enabling an elimination of the grains, particles or other residual matter from the surface of the parts obtained by additive manufacturing, or from the bristles or interstices of the those parts. The washing corresponds to a type of cleaning implementing a washing product, whether or not aqueous.

Washing in an appropriate solution may be carried out. The washing may be carried out based on a principle of washing by reflux.

The washing device employed may comprise several sections, for example:
- a washing tank called boiler;
- a rinsing tank;
- an evaporation zone;
- a drying zone; and
- a condensing coil at 4° C. making it possible to collect and recycle the washing product.

The washing tank may comprise a rotating basket comprising mesh, and/or immersed jets.

In the washing and/or rinsing tanks, the parts may be subjected to ultrasound. The ultrasound used may have a frequency comprised between 25 kHz and 45 kHz.

The washing may in particular be carried out in a 50% solution of isopropyl alcohol or preferably in a fluoroketone solution.

This chemical solution has a good level of effectiveness in the elimination of the residual sand-blasting spheres, and more generally in the elimination of the particles of dimensions less than 80 microns, without altering the mechanical properties of the parts, in particular of the cosmetic product applicators.

Additionally or alternatively, screening of the parts may be envisioned to screen the parts under micro-vibration and/or blowing. This also has the advantage of being carried out in a dry environment.

Qualifying (S4)

A qualifying S4 may make it possible to ensure that the final parts obtained at the end of the post-treatment procedure meet certain qualitative criteria.

In particular, the qualifying can make it possible to ensure the absence of potentially irritant particles in the finished products.

The qualifying may be carried out periodically during the production, at regular or random intervals, or more preferably by random sampling of a specific number of parts in each batch. A batch may for example be constituted by a group of 10 000 to 100 000 parts, and 8 to 100 parts may be sampled from each batch.

At the qualifying part of the method, it can be checked that none of the sampled parts includes particles that are detached or liable to detach on use, of which the greatest dimension is greater than 500 microns.

The number of particles that are detached or liable to detach on use, of smaller dimension, may also be checked. For example, it is possible to check the number of particles of which the largest dimension is comprised between 150 microns and 500 microns. For example, the qualifying may enable a predefined maximum number of such particles (not critical for the consumer) for a given quantity of applicators to be present (for example 7 particles for a sample of 32 applicators in a batch of 10 000 to 100 000 parts or for instance 10 particles for a sample of 50 parts of a group of more than 500 000 parts). In case of non-compliance detected at the qualifying part of the method, the batch concerned may be rejected or destroyed. Measures for checking the method and/or for correcting the manufacturing parameters may be taken.

In the method shown in FIG. 3, the stripping S1 may in particular comprise a sand-blasting S1'.

The optional steps (i.e., optional parts of the method) of pre-blowing S0 and of washing/cleaning S3 described above may cause the optimum parameters for carrying out the other steps to vary, but they may be incorporated independently of each other in one of the methods according to FIG. 1 or FIG. 2. The qualifying S4 may be incorporated in any one of the methods according to FIG. 1, FIG. 2, or FIG. 3, or may generally be conducted in order to qualify certain parts, whatever the mode of obtaining them or the post-treatment they have undergone.

Figure 4:
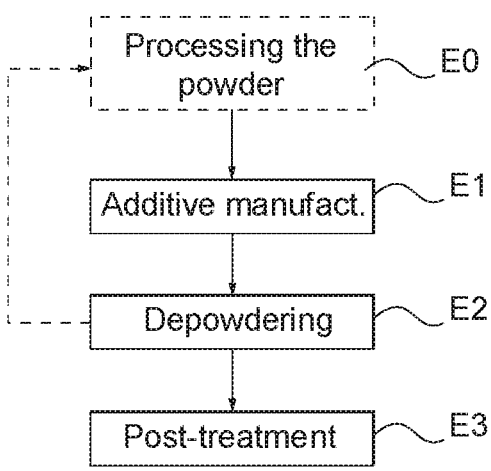
FIG. 4 is a block diagram representing a method of manufacturing a part in accordance with a second aspect of the invention, comprising a post-treatment method according to the first aspect of the invention.

FIG. 4 represents a method of manufacturing a part in accordance with a second aspect of the invention. This method comprises an additive manufacturing E1, followed by a E2 of depowdering the parts, itself followed by a post-treatment method E3 corresponding to a post-treatment in accordance with the invention, for example as described with reference to one of FIGS. 1 to 4. A prior processing of the powder E0 may optionally be provided.

Additive Manufacturing (E1)

The additive manufacturing E1 is carried out by sintering a powder, in particular a powder of a plastic material. The additive manufacturing method employed is advantageously a method of powder bed fusion, powder binding, also called "selective laser sintering".

A powder bed fusion method consists of producing objects from materials in powder form using one or more lasers in order to selectively melt the particles of powder at the surface of the powder bed, layer after layer, in a closed chamber. The type of powder used may be of any type of powder able to be used in such a method.

The powder employed may in particular be a powder of a thermoplastic polymer, or a powder of a polyamide, preferably an aliphatic polyamide, for example polyamide 11, also designated PA 11, or of polyacrylamide.

Polyamide 12 or PA12 may also be employed with success, although PA 11 is preferable to it for certain applications, in particular the manufacture of cosmetic product applicators, since it is more supple. An example of PAH powder that is particularly suitable is the powder commercialized under the reference "PA1101" by the company EOS Materials.

Preferably, in particular for the manufacture of cosmetic product applicators, the powder has grains of which the greatest dimension is less than or equal to 150 microns. Preferably, the greatest dimension is less than or equal to 80 microns, or still more preferably less than or equal to 60 microns.

The machine employed for the additive manufacturing may be a machine commercialized under the designation FORMIGA P110 by the company EOS Materials, or any equivalent machine.

In the manufacturing step, the additive manufacturing machine is first of all loaded with powder.

For example, the manufacturing may be carried out in a tank containing approximately 10 kg of powder (typically for PA11). The manufacturing may be carried out over several levels, for example between two and ten levels, in particular over ten levels.

The formation of untreated parts by laser sintering then begins. According to one embodiment given by way of example, the powder in the tank is kept at 150° C. approximately. The laser or lasers then provide the additional energy required for the localized melting of the powder. For example, a laser of 25 W may be employed with success.

Several passes of the laser may be necessary.

The formation by additive manufacturing of a batch of three thousand to four thousand parts (of the size of a mascara brush) may take approximately fifteen hours under these conditions. At the end of this phase of forming the untreated parts, the group must be cooled. In the example taken above the cooling may last of the order of fifteen hours. The total time of the additive manufacturing may thus be of the order of 30 hours.

In order to avoid oxidation, the cooling is advantageously carried out under a neutral gas, for example under argon.

In order to be able to optimize the cycle times, and more simply the time of use of the additive manufacturing machine for the formation of untreated parts, the cooling may be carried out outside the machine, with placing under a neutral gas (in particular under argon) of the content of the tank.

The additive manufacturing E1 is carried out in a machine which uses a digital file geometrically representing the part to produce. The file is obtained after having designed the part to produce on a computer-aided design (CAD) software application. This file may be in STL format or any other standard file format which may be used for additive manufacture by powder bed fusion. The file is then processed by a software application supplied by the manufacturer of the machine used for the additive manufacture. This software cuts the file into sections in the form of digital images (for example a hundred images) for example in SU or BFF format, each of them corresponding to a layer of the model to print, that is to say a cross-section of the part to produce taken in a plane perpendicular to a given axis. These data are then sent to the additive manufacturing machine in order for it to produce the part.

The additive manufacturing thus results in the formation of untreated parts buried in the powder and clogged with powder.

Depowdering (E2)

The additive manufacturing E1 is followed by depowdering E2. This makes it possible to separate the untreated parts from the powder.

The recovered powder may be re-used, as described below with regard to a processing E0 of the powder. To that end, the recovered powder may undergo a sorting method in order to keep only the grains of which the greatest dimension is less than or equal to a given size (for example 150 microns, 80 microns or 60 microns).

The depowdering consists of separating the untreated parts from the powder in which they are buried, and of eliminating a maximum of powder carried by the untreated part (for example in the nooks of the untreated part, in the bristles of an untreated part such as a cosmetic product applicator). This may be carried out manually. By manually is meant that an operator must grasp the untreated parts, individually or in groups, and remove the powder therefrom by stirring, blowing, and/or brushing.

The depowdering may be carried out automatically, which is advantageous for the production of parts, in particular small parts of complex shapes such as the cosmetic product applicators, at an industrial scale.

Preferably, this operation is carried out in a depowdering cabin, in order to ensure production at an industrial scale, for example more than 200 000 parts per week.

The manual depowdering and all the more so the automatized depowdering, may nevertheless leave residual powder on the parts.

However, for numerous applications in various technical fields, the absence of residual powder is fundamental. For example, regarding the production of applicators of cosmetic products, in particular for the application of a cosmetic product near the eyes, the applicant has found that not only was it necessary to separate the untreated applicators for cosmetic products so obtained from the powder, but that it was also important to guarantee the total absence of grains detached from the applicator (for example retained in its bristles) or liable to detach on use, and of which the greatest dimension is above a given size, liable to give rise to ocular irritation. The post-treatment described with reference to FIGS. 1 to 4 aims at the total elimination of these grains. Typically, the post-treatment aims at eliminating all the particles greater than 500 microns. As a matter of fact, particles of dimensions greater than the dimensions of the initial grains of powder may be generated at the time of the additive manufacturing, for example in case of incomplete sintering of certain grains.

Post-Treatment (E3)

At this stage of the manufacturing method, a post-treatment method E3 in accordance with the invention is applied, for example an method such as described with reference to one of FIGS. 1 to 4. Further to the post-treatment, the final parts obtained are devoid or almost devoid of residual particles that are detached or liable to detach.

Processing of the Powder (E0)

In order to obtain the desired final surface state, it is important for the powder employed for the additive manufacturing E1, for example of PA 11 or PA 12, to have suitable characteristics at the outset. This is the object of the processing of the powder E0, prior to the of additive manufacturing E1.

The characteristic which appears to be the most important is the particle size of the powder employed.

Typically, the applicant has found the importance of employing a fine and homogenous powder to avoid defects on the final part.

For the production of small parts, in particular parts comprising bristles, for example cosmetic product applicators, the powder employed must advantageously only have grains of which the greatest dimension is less than 150 microns. Advantageously, a still finer powder may be employed, namely of which the greatest dimension of the grains is less than 80 microns or 60 microns.

The desired characteristics, in particular the particle size, may be guaranteed by selecting a commercially available powder having these characteristics. Nevertheless, for obvious reasons of cost, it is advantageous to be able to re-use the powder referred to as used, that is to say having already been employed at the additive manufacturing E1. In particular, a certain portion of the powder recovered at the depowdering E2 may be re-used for a following cycle (or batch).

The used powder may have been altered, compared with the new powder, at the time of the additive manufacturing, even if this powder is not linked to the untreated part manufactured. The grains of powder may have been deformed by heat, be bonded or partially sintered.

In order for the used powder to be re-used without compromising the characteristics of the final product, the recovered used powder is calibrated by a suitable sorting or calibration method. In particular screening of the used powder may be carried out. Several types of screening may be envisioned in order to separate, from the recovered powder, the grains having a dimension greater than the maximum dimension desired. It is in particular possible to use screening by ultrasound, by micro-vibration and/or by blowing.

The desired maximum dimension of the greatest dimension of the grains may for example be 150 microns, or 80 microns, or 60 microns.

The sorting or screening enables the recovery of calibrated used powder, which is suited to re-use for the additive manufacturing of parts similar to those produced in the preceding cycle.

In the processing the powder S0, a mixture of new powder and calibrated used powder is thus carried out. It is sought to re-use the used powder to the maximum. Satisfactory results have been obtained, with a PA 11 powder, with a new powder/used powder ratio comprised between 100/0 and 50/50, in particular comprised between 70/30 and 50/50, for example of the order of 60/40.

The invention thus provides a method of post-treatment of one or more parts obtained by additive manufacturing by sintering a powder of a plastic material. This post-treatment which causes to succeed each other an operation of stripping the part and of ionizing blowing makes it possible to eliminate, by the choice of suitable parameters in each of these parts of the method, the particles that are detached or liable to detach from the part on use, even if those particles are lodged in interstices or in the bristles which the part comprises.

The invention can apply to numerous types of plastic parts, in various technical fields where the absence of particles on the parts is important. One of the preferred applications of the invention is the post-treatment of cosmetic product applicators, and in particular of applicators configured for the application of cosmetic product near the eyes, such as mascara brush.

The method guarantees the absence of particles of dimensions greater than a given dimension (for example 500 microns).

The method can also make it possible to guarantee a maximum number of particles in certain ranges of dimensions (for example between 150 microns and 500 microns).

The invention also relates to a manufacturing method implementing such a post-treatment method, for obtaining parts through additive manufacturing that are devoid or practically devoid of particles, at least in certain ranges of dimensions of particles which are not desired.

The invention claimed is:

1. A method of post-treatment of a part obtained by additive manufacturing by sintering of a powder of a plastic material, for the elimination, an at least partially sintered part, of the particles detached from said part or that are partially sintered, the method comprising successively:
   stripping (S1), thereby obtaining a stripped part; and
   ionizing blowing (S2) of the stripped part, comprising blowing ionized air onto the part;
   wherein the stripping is performed in a rotary barrel; and
   the ionizing blowing is performed with two ionizing bars, one ionizing bar being positioned inside said rotary barrel and another ionizing bar being disposed outside said rotary barrel.

2. The method of post-treatment according to claim 1, wherein:
   the stripping comprises sand-blasting (S1') said part.

3. The method of post-treatment according to claim 2, wherein:
the sand-blasting employs glass microspheres of a diameter comprised between 45 and 90 microns.

4. The method of post-treatment according to claim 1, comprising:
pre-blowing prior to the stripping (S1).

5. The method of post-treatment according to claim 1, further comprising:
a final method part of washing (S3).

6. The method of post-treatment according to claim 5, wherein:
the washing (S3) comprises washing of the part in a non-aqueous solvent.

7. The method of post-treatment according to claim 1, wherein:
the stripping (S1) and the ionizing blowing (S2) are carried out in batches of 300 to 10 000 parts.

8. The method of manufacturing a part from plastic material, comprising:
additive manufacturing (E1) by sintering a powder of the plastic material, followed by depowdering (E2); and
a method of post-treatment (E3) according to claim 1.

9. The manufacturing method according to claim 8, wherein:
the plastic material is a polyamide.

10. The manufacturing method according to claim 8, wherein:
the plastic material is an aliphatic polyamide.

11. The manufacturing method according to claim 8, wherein:
the plastic material is an aliphatic polyamide in the form of polyamide 11.

12. The manufacturing method according to claim 8, further comprising, prior to the additive manufacturing (E1):
processing of the polyamide powder (E0) comprising:
providing new powder having only grains of which a greatest dimension is less than or equal to 150 microns;
providing so-called used powder having already served for an additive manufacturing method part, and a calibration of said used powder in order for it to have only grains of which a greatest dimension is less than or equal to 150 microns; and
mixing the new powder and the calibrated used powder in a new powder/used powder ratio comprised between 70/30 and 50/50.

13. The manufacturing method according to claim 8, further comprising, prior to the additive manufacturing (E1):
processing of the polyamide powder (E0) comprising:
providing new powder having only grains of which a greatest dimension is less than or equal to 150 microns;
providing so-called used powder having already served for an additive manufacturing method part, and a calibration of said used powder in order for it to have only grains of which a greatest dimension is less than or equal to 150 microns; and
mixing the new powder and the calibrated used powder in a new powder/used powder ratio of about 60/40.

14. The method of producing parts comprising a manufacturing method according to claim 8, further comprising:
at least one qualifying method part (S4) comprising determining, in a batch of a predetermined number of parts, a number of residual particles that are detached or partially sintered of a largest dimension greater than a predefined dimension, and, if said number of particles is not zero, modifying at least one parameter of a post-treatment, then performing a succession of manufacturing methods and qualifying method parts until said number of particles of largest dimension greater than a predefined dimension is zero.

* * * * *